(12) United States Patent
Hales et al.

(10) Patent No.: US 12,731,969 B2
(45) Date of Patent: Sep. 8, 2026

(54) CABLE CONNECTOR RETAINING ASSEMBLY

(71) Applicant: Prairie Machine & Parts Mfg.—Partnership, Saskatoon (CA)

(72) Inventors: Michael Hales, Saskatoon (CA); Alex Nascimento, Saskatoon (CA)

(73) Assignee: Prairie Machine & Parts Mfg.—Partnership, Saskatoon (CA)

( * ) Notice: Subject to any disclaimer, the term of this patent is extended or adjusted under 35 U.S.C. 154(b) by 203 days.

(21) Appl. No.: 18/731,799

(22) Filed: Jun. 3, 2024

(65) Prior Publication Data

US 2025/0372969 A1 Dec. 4, 2025

(51) Int. Cl.
*H02G 3/06* (2006.01)

(52) U.S. Cl.
CPC ................................ *H02G 3/0658* (2013.01)

(58) Field of Classification Search
None
See application file for complete search history.

(56) References Cited

U.S. PATENT DOCUMENTS 7,534,965 B1 * 5/2009 Thompson ............... H02G 3/22 174/152 G
8,089,002 B2 * 1/2012 Hasegawa ................ H02G 3/22 174/152 G
8,350,163 B2 * 1/2013 Auray ....................... F16L 5/00 174/665
8,779,304 B2 * 7/2014 Spilker ................ H02G 3/0616 174/653
8,969,740 B2 * 3/2015 Thizon ..................... H05K 7/00 174/665
9,012,791 B2 * 4/2015 Smith ...................... H02G 3/22 174/664
2010/0307816 A1 * 12/2010 Hurrell ................. F16B 37/067 174/650
2012/0193140 A1 * 8/2012 Briere ...................... H02G 3/22 174/650
2014/0069711 A1 * 3/2014 Barna .................... H02G 3/088 174/650
2015/0316189 A1 * 11/2015 Dhotre .................... F16L 15/04 285/70
2016/0005516 A1 * 1/2016 Okuhara ............. B60R 16/0222 174/650
2019/0109410 A1 * 4/2019 Johnson ............... H02G 3/0658

* cited by examiner

*Primary Examiner* — Krystal Robinson
(74) *Attorney, Agent, or Firm* — Marshall & Melhorn, LLC

(57) ABSTRACT

A cable connector retaining assembly for use with an electrical enclosure is disclosed. The assembly includes a cable connector configured coupling with a cable. The connector is configured for slidable insertion into an opening defined by an enclosure and is connected to the enclosure via a retaining configuration. The cable connector includes a retainer receiving groove that cooperates with the retaining configuration such that, while the cable connector is disposed within the opening defined by the enclosure and connected to the enclosure by the retaining configuration, a portion of the retaining configuration is disposed within the retainer receiving groove such that longitudinal displacement of the cable connector relative to the enclosure, is resisted. The engagement between the retaining configuration and the retainer receiving groove facilitates the connection between the connector and the enclosure while also creating a complex flame path for mitigating against explosive events.

16 Claims, 5 Drawing Sheets

CABLE CONNECTOR RETAINING ASSEMBLY

TECHNICAL FIELD

This disclosure relates to cable connector assemblies for use in explosive environments and, in particular, for securing explosion proof cable connectors to explosion proof electrical enclosures.

BACKGROUND

Explosion proof cable connectors or cable glands are components used in explosion proof electrical enclosures to allow access for a cable from outside of the enclosure, to cross the barrier and to enter the enclosure. The contacting area between the cable gland housing and the enclosure itself is considered the flame path, specifically, the path a flame would have to take while exiting the enclosure in the case of an explosion or internal combustion from within the enclosure. In order to meet industry regulations and safety standards, the enclosure must be able to withstand an explosion or other incident of internal combustion from within the enclosure and safely allow energy from the internal explosion or other incident of internal combustion to dissipate to a safe level before exiting the enclosure. The design intent of a flame path, therefore, is to safely allow energy from an internal explosion within the enclosure to dissipate to a safe level before exiting the enclosure in the form of air so as to mitigate potential ignition of the combustible environment external to the enclosure.

Explosion proof cable connectors or cable glands often use a threaded design wherein the connector or gland housing is secured to the electrical enclosure by way of a threaded connection. Threaded connections offer an intricate flame path for the energy from an internal explosion to transverse the barrier, providing an effective means of reducing the exiting energy to a safe level prior to exiting the enclosure. At least one drawback associated with the use of a threaded connection between the cable gland housing and the enclosure is that on enclosures requiring multiple glands, installation and service can be hindered by the requirement of tool access to physically thread the glands in and out of the enclosure next to adjacent glands.

A slip fit cable gland is an alternative design to the traditional threaded design. In slip fit cable gland designs the gland housing can be installed and removed directly from the enclosure without requiring the gland housing to be threaded in position for installation. In slip fit designs, one or more retainer plate(s) and associated hardware are used to secure the gland housing to the enclosure. Slip fit cable gland designs, however, typically provide for a less intricate flame path and are more likely to allow energy from within the enclosure (i.e. due to explosion or other incident of internal combustion) to transverse this barrier without adequate reduction and exit the enclosure leading to the potential of an external combustion/explosion. Slip fit designs, therefore, have been found to have difficulty meeting industry safety standards and regulations. In some instances, issues associated with the less complex flame path can be mitigated by the tightening of diametrical tolerances of the two mating components or increasing the length of the flame path by increasing the thickness of the walls of the enclosure. However, both of these methods will increase the overall cost of the enclosure, while making it more difficult to handle and service, which can also lead to additional increases on overall cost.

Accordingly, there is a need for cable connectors and cable connector retaining assemblies for securing cable connectors to an enclosure that allow for easy-to-use and serviceable benefits while still providing explosion-proof features that are capable of meeting testing requirements for industry regulations and safety standards. Assemblies for securing cable connectors or glands to an enclosure that provide the required explosion and/or flame proof features that avoid undue increase in manufacturing costs are also desirable.

BRIEF SUMMARY OF SOME EXAMPLE EMBODIMENTS

According to a first exemplary embodiment of the present disclosure there is provided a cable connector retaining assembly, comprising a cable connector configured for slidable insertion into a cable connector receiving opening defined by an electrical enclosure, and a retaining configuration configured for coupling with the cable connector and for securing the cable connector to the electrical enclosure. The cable connector includes a retainer receiving groove, and a rotation impeder. The cable connector and the retaining configuration are co-operatively configured for connection to the electrical enclosure such that, while the cable connector is disposed within the cable connector receiving opening and the retaining configuration is connected to the enclosure: the cable connector is supported within the cable connector receiving opening by the retaining configuration; a cable connector engaging portion of the retaining configuration is disposed within the retainer receiving groove such that longitudinal displacement of the cable connector within the cable connector receiving opening, relative to the enclosure, is resisted; and rotation of the cable connector within the cable connector receiving opening relative to the retaining configuration is impeded due to interference to movement between the rotation impeder and an opposing surface defined by the cable connector engaging portion.

These and further aspects of the invention are described in detail in the following examples and accompanying drawings. Other aspects and features of the present disclosure will become apparent to those of ordinary skill in the art upon review of the following description of specific implementations of the application in conjunction with the accompanying figures.

BRIEF DESCRIPTION OF THE DRAWINGS

Reference will now be made, by way of example, to the accompanying drawings which show example embodiments of the present application, and in which.

DETAILED DESCRIPTION

Figure 1:
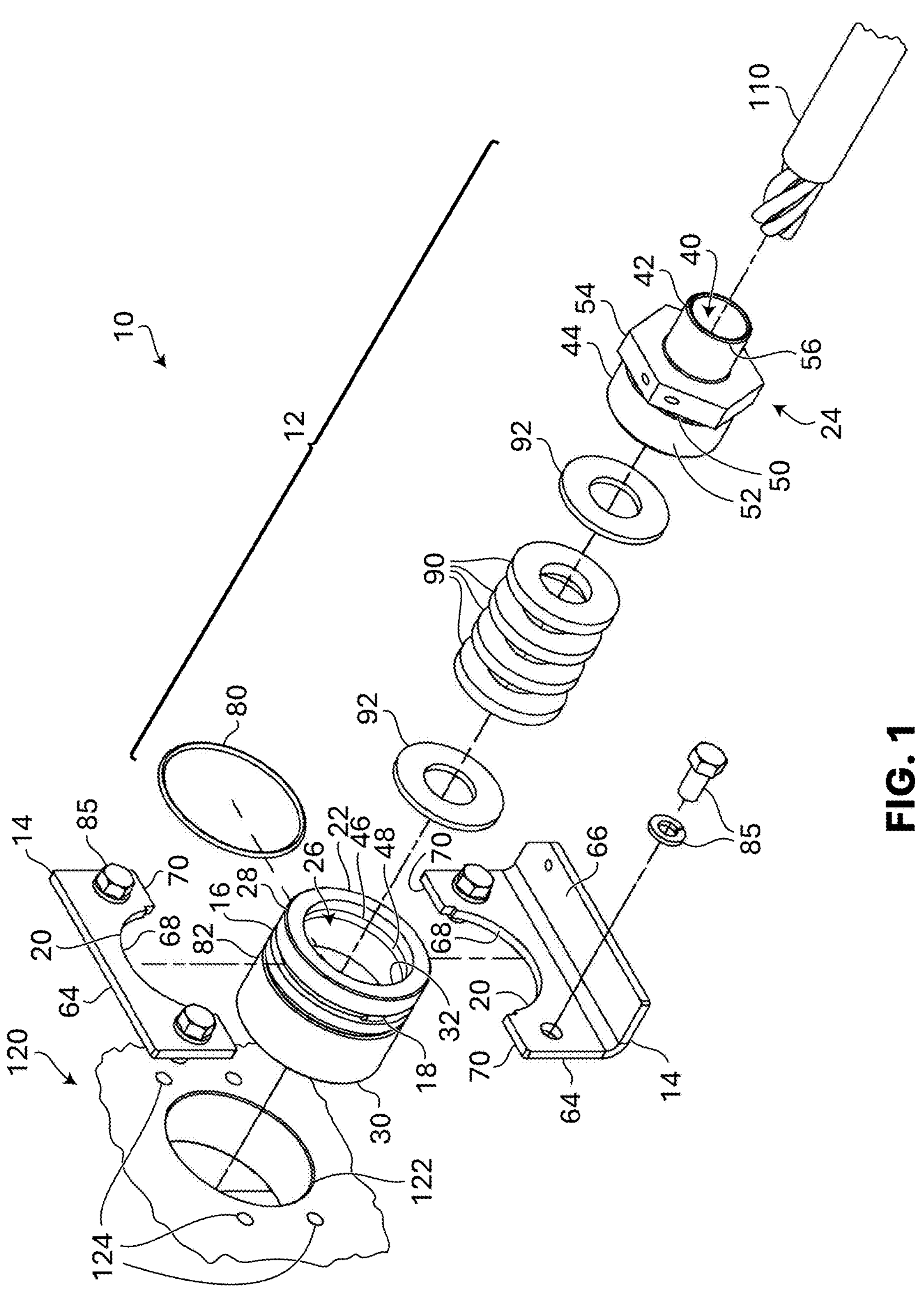
FIG. 1 is an exploded upper perspective view of an example embodiment of the cable connector retaining assembly of the present invention in use for mounting to an enclosure.

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements.

Referring now to FIG. 1 there is shown an example embodiment of a cable connector retaining assembly 10 according to the present disclosure. The cable connector retaining assembly 10 is configured for coupling with an electrical cable 110 and for connection with an electrical enclosure 120 thereby allowing the electrical cable 110 to be connected within the electrical enclosure 120. It will be understood that the electrical enclosure 120 may be in the form of any known or conventional enclosure or housing for use in electrical assemblies found in explosive environments. Furthermore, it will be understood that, while only a portion of the electrical enclosure 120 and a singular connection opening 122 for receiving a singular cable connector retaining assembly 10 is shown in FIG. 1 for ease of illustration, the enclosure 120 may include multiple connection openings 122 for connection with a plurality of individual cable connector retaining assemblies 10.

The cable connector retaining assembly 10 includes a cable connector 12 configured for slidable insertion into the enclosure opening, or cable connector receiving opening, 122 defined by an electrical enclosure 120, and a retaining configuration 14 comprising, for example, a pair of retainers configured for coupling with the cable connector 12 and for securing the cable connector 12 to the electrical enclosure 120.

The cable connector 12 includes a retainer receiving groove 16 and a rotation impeder 18 and is configured for co-operation with the retaining configuration 14 such that while the cable connector 12 is disposed within the cable connector receiving opening 122 and the retaining configuration 14 is coupled to the electrical enclosure 120, the cable connector 12 is supported within the cable connector receiving opening 122 by the retaining configuration 14 and the connection of the retaining configuration 14 to the electrical enclosure 120. The retaining configuration 14 includes a cable connector engaging portion 20 that is configured to be received within the retainer receiving groove 16 defined by the cable connector 12. Accordingly, when the cable connector 12 is disposed within the cable connector receiving opening 122 and connected to the electrical enclosure 120 via the retaining configuration 14, the cable connector engaging portion 20, defined by the retaining configuration 14, is disposed within the receiving groove 16 such that longitudinal displacement of the cable connector 12 within the cable connector receiving opening 122, relative to the enclosure 120, is resisted. The resistance to longitudinal displacement of the cable connector 12 within the cable connector receiving opening 122 is due, at least in part, to interference to movement of the cable connector 12, relative to the enclosure 120, by the cable connector engaging portion 20 of the retaining configuration 10 with a corresponding abutting surface defined by at least one of the sidewalls that define the retainer receiving groove 16 as a result of the recessing of the cable connector engaging portion 20 of the retaining configuration 14 within the retainer receiving groove 16. Rotation of the cable connector 12 within the cable connector receiving opening 122 about the longitudinal axis of cable connector 12 is also impeded due to interference between the rotation impeder 18 defined by the cable connector 12 and a corresponding opposing surface defined by the cable connector engaging portion 20 of the retaining configuration 14, as will be described in further detail below with reference, in particular, to FIGS. 5 and 6.

In some embodiments, for example, the cable connector 12 includes a first housing portion 22 and a second housing portion 24. The second housing portion 24 is configured for releasable connection with the first housing portion 22 for securing a cable 110 within the first housing portion 22 such that the cable 110 can be electrically connected and secured within the electrical enclosure 120. The first housing portion 22 includes an internal passage 26 configured for receiving an end portion of an electrical cable 110. The internal passage 26 extends longitudinally through the first housing portion 22 from a first end 28 to a second end 30, the first end 28 defining a first end opening 32 and the second end 30 defining a second end opening 34. In some embodiments, for example, the first housing portion 22 is configured such that the first end opening 32 has a diameter, D1, that is greater than a diameter, D2, defined by the second end opening 34. In some embodiments, for example, the second end 30 having a second end opening 34 that has a diameter D2 that is less than the diameter D1 of the first end opening 32 provides an end surface 36 of the first housing portion 22 that serves as a stop for preventing passage of components through the first housing portion 22 as will be discussed in further detail below in reference to the assembly and usage of the cable connector 12 and retaining configuration 14.

In the subject example embodiment, the first housing portion 22 of the cable connector 12 includes the retainer receiving groove 16, the retainer receiving groove 16 defined within the outer surface 23 of the first housing portion 22 such that the retainer receiving groove 16 extends into the first housing portion 22 from the outer surface 23 to a base surface 25 of the groove 16. Accordingly, in some embodiments, for example, the retainer receiving groove 16 is defined by a pair of spaced apart side walls 27 formed within the first housing portion 22 with the base surface 25 extending between the side walls 27 at the lower or base end thereof.

Figure 2:
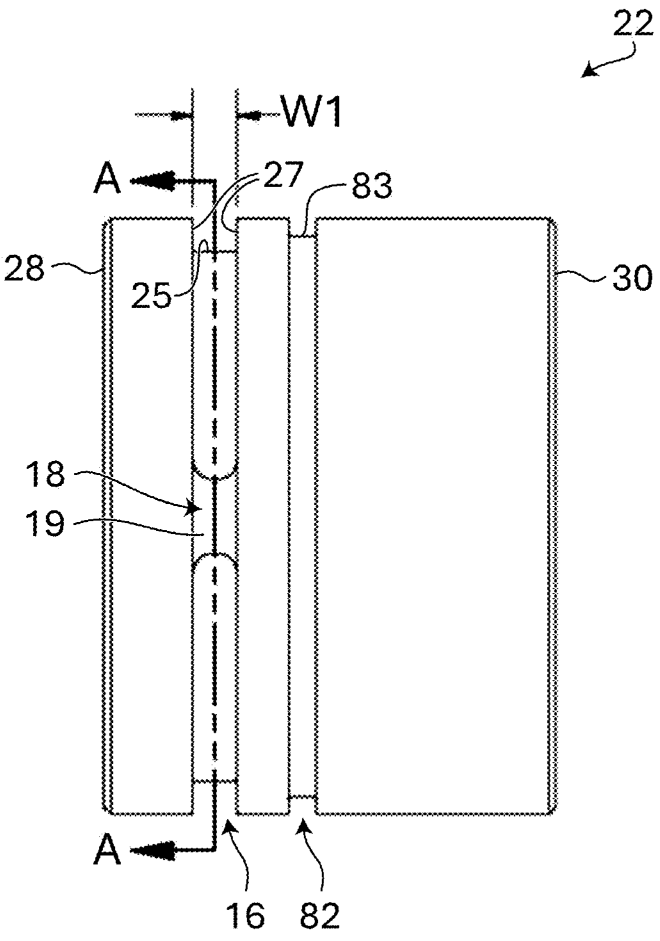
FIG. 2 is a side view of a first housing portion of the cable connector of the assembly of FIG. 1.
Figure 3:
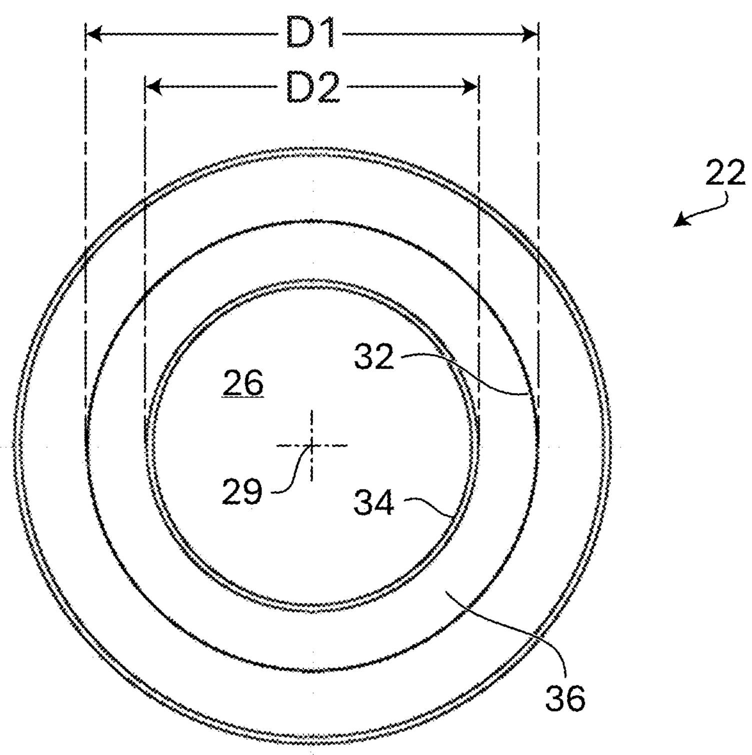
FIG. 3 is a front view of the first housing portion of FIG. 2.
Figure 4:
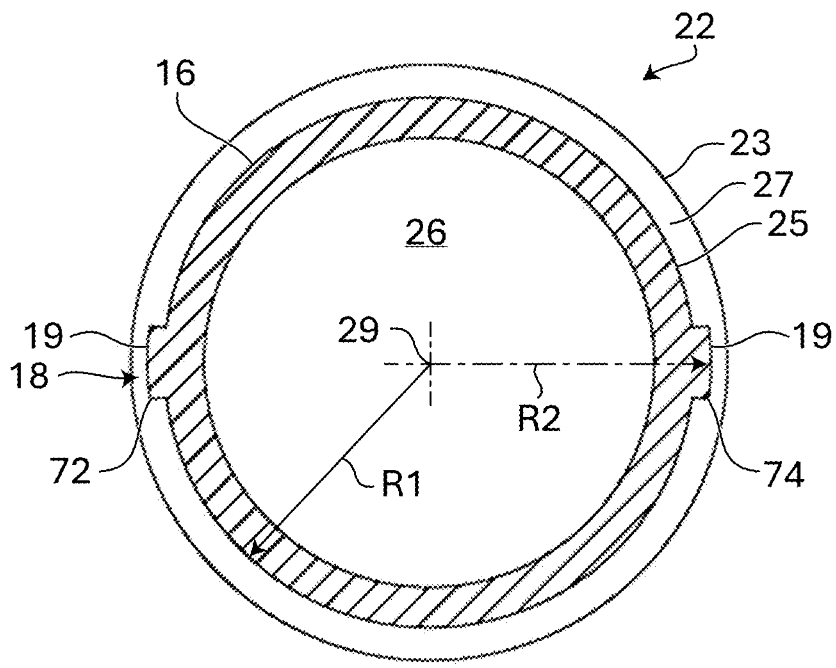
FIG. 4 is a section view of the first housing portion as taken along section line A-A of FIG. 2.

In the subject example embodiment, the first housing portion 22 of the cable connector 12 further includes the rotation impeder 18. As shown, for example, in FIGS. 2 and 4, the rotation impeder 18 is disposed within the retainer receiving groove 16. In some embodiments, for example, the rotation impeder 18 includes at least a first protrusion 72 disposed within the retainer receiving groove 16. In some embodiments, for example, the rotation impeder 18 includes a first protrusion 72 and at least one additional protrusion 74 disposed in spaced apart relationship within the receiving groove 16. In some embodiments, for example, the at least one additional protrusion 74 is a second protrusion. In other embodiments, for example, the at least one additional protrusion 74 includes two or more additional protrusions. The first protrusion 72 and the at least one additional protrusion 74 each, independently, extend outwardly from the base surface 25 of the retainer receiving groove 16 along an axis that extends normal to the base surface 25. In example embodiments wherein the first housing portion 22 is generally in the form of a cylindrical body, it will be understood that the first protrusion 72 and the at least one additional protrusion 74 extend radially outwardly from the base surface 25 of the groove 16. Each one of the first protrusion 72 and the at least one additional protrusion 74, independently, define a height, as measured along an axis that extends normal to the base surface 25 of the retainer receiving groove 16 that is less than the overall depth of the retainer receiving groove 16 as defined by the sidewalls 27 of the groove 16. Accordingly, it will be understood that while each of the protrusions 72, 74 extend radially outward from the base surface 25, both the first protrusion 72 and the at least one additional protrusion, or second protrusion 74 remain recessed within the groove 16. Accordingly, in some respects, the retainer receiving groove 16 and the rotation impeder 18 together define a stepped groove profile having a first groove diameter defined by a first radius, R1, as measured relative to a central axis 29 that extends through the inner passage 26 of the first housing portion 22 to the base surface 25 defined by the groove 16 that is less than a second groove diameter defined by a second radius, R2, as measured relative to the central axis that extends through the inner passage 26 of the first housing portion 22 to an outermost surface 19 of the first and/or second protrusion 72, 74. In some embodiments, for example, the first protrusion 72 and the at least one additional protrusion 74 are spaced apart from each other within the retainer receiving groove 16 equidistantly such that the distance between each adjacent pair of protrusions within the groove 16 is the same. In example embodiments wherein the rotation impeder 18 includes a first protrusion 72 and a second protrusion 74, the protrusions are spaced from each other 180° within the groove 16 such that they are disposed along a horizontal axis that extends transverse to the central longitudinal axis 29 that extends through the inner passage 26. However, it will be understood that rotation impeder 18 is not limited to two individual protrusions arranged at 180° from each other and that other quantities and configurations may be used provided that the rotation impeder 18 is configured for engaging with the cable connector receiving portion 20 of the retaining configuration 14 for preventing rotation of the cable connector 12 within the cable connector receiving opening 122 defined by the enclosure 120.

In some embodiments, for example, cable connector 12 is co-operable with a sealing member 80 for establishing a sealed interface with an inner surface of the cable connector receiving opening 122 defined by the enclosure 120. In order accommodate an external sealing member 80, the first housing portion 22 is configured to include a sealing member receiving groove 82 defined within the outer surface 23 of the first housing portion 22, the sealing member receiving groove 82 extending into the first housing portion 22 from the outer surface 23 to a base surface 83 of the sealing member receiving groove 82 for receiving the sealing member 80, for example, an O-ring. As the sealing member 80 is for establishing a sealed interface with the internal surface of the cable connector receiving opening 122 when the cable connector 12 is slidably inserted into the cable connector receiving opening 122, the sealing member receiving groove 82 is arranged longitudinally spaced apart from the retainer receiving groove such that the sealing member receiving groove 82 is more inwardly disposed relative to the first end 28 of the first housing portion 22 than the retainer receiving groove 16 as the retainer receiving groove 16 is intended to remain outwardly disposed from the cable connector-receiving opening 122 of the enclosure 120 for establishing an interface with the retaining configuration 14, as will be described in further detail below.

The second housing portion 24 includes an internal passage 40 that extends longitudinally through the second housing portion 24 from a cable-receiving end 42 to a coupling end 44 that is configured for coupling with the first housing portion 22 for establishing the releasable connection between the first housing portion 22 and the second housing portion 24. In some embodiments, for example, the releasable connection is a threaded connection defined by engagement between an internal thread 46 defined by the inner surface 48 of the first housing portion 22 that defines the internal passage 26, and an external thread 50 defined by an outer surface 52 of the coupling end 44 of the second housing portion 24. In some embodiments, for example, the second housing portion 24 includes an outer surface portion 54 configured for co-operating with a tool used for securing the second housing portion 24 to the first housing portion 22. In some embodiments, for example, the outer surface portion 54 is configured as a retaining nut for co-operating with a wrench or any other suitable tool to assist with the connection of the second housing portion 24 to the first housing portion 22. In some embodiments, for example, the cable-receiving end 42 of the second housing portion 24 defines an outer surface 56 that is configured for cooperating with a hose, guard, outer sleeve, or any other suitable device, that is positioned over top of the cable 110 which can be secured to the second housing portion 24 by disposition of a corresponding end of the hose, guard or outer sleeve in overlapping relationship with the outer surface 56 of the cable-receiving end 42 of the second housing portion 24. The positioning of the hose, guard or outer sleeve (or other suitable device) in overlapping relationship with the outer surface 56 of the cable-receiving end 42 of the second housing portion 24 serves to further protect the cable 110 at the junction where the cable 110 enters the cable connector 12.

Figure 5:
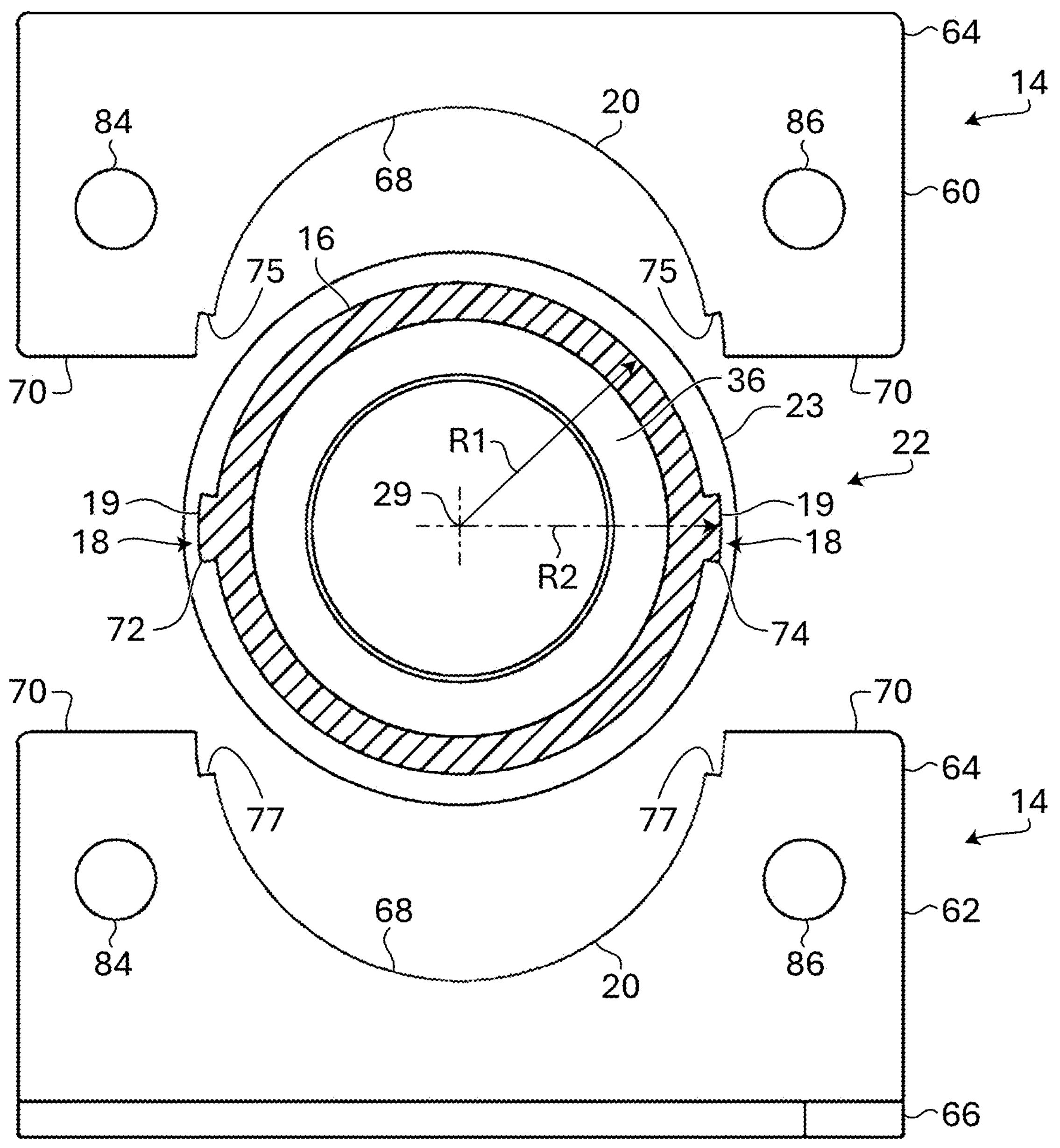
FIG. 5 is a schematic front, assembly view of the first housing portion, as taken along section line A-A of FIG. 2, in use with retainer plates for mounting the first housing portion to the enclosure.
Figure 6:
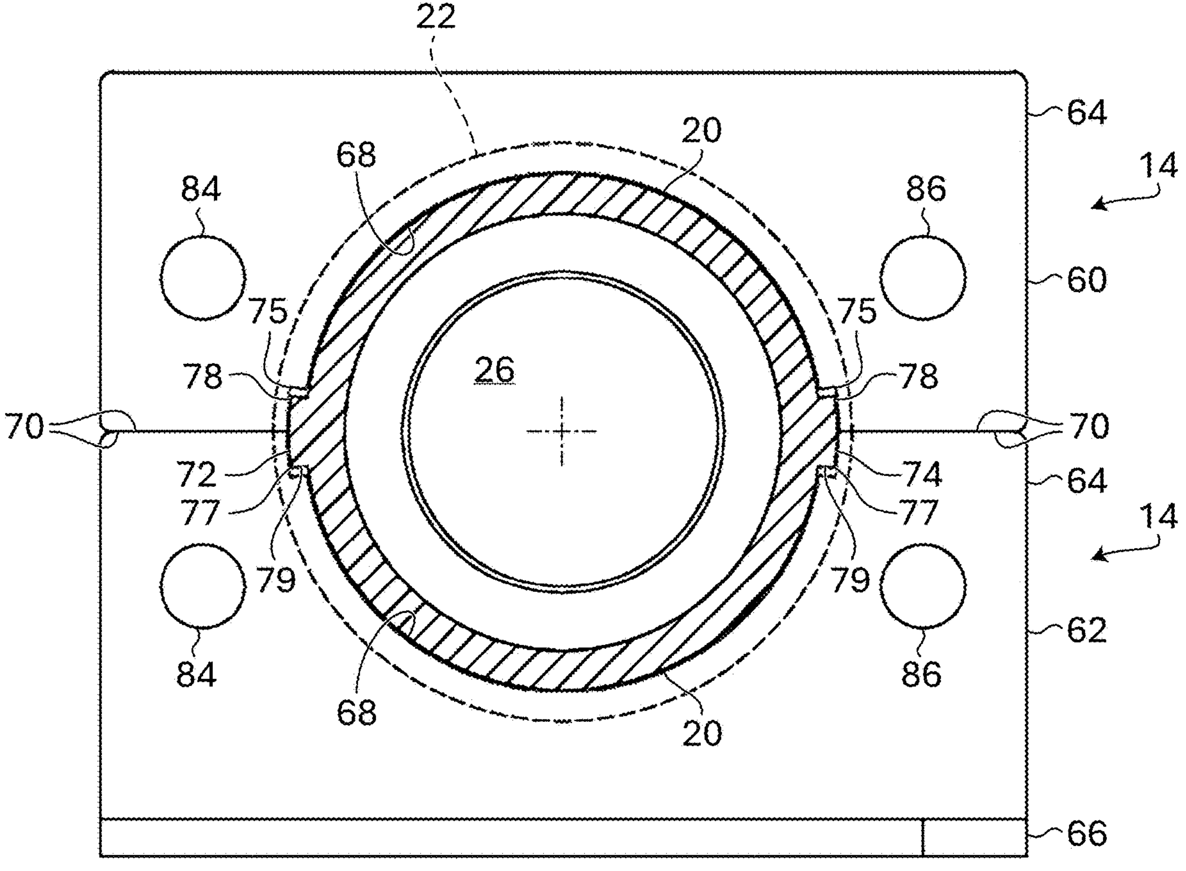
FIG. 6 is a front view of the first housing portion and retainer plates of FIG. 5 in an assembled state.

With reference to FIGS. 1, 5 and 6, the retaining configuration 14 for coupling with the cable connector 12 and for connecting the cable connector 12 to the electrical enclosure 120 will now be described in further detail. The retaining configuration 14 includes a first retaining plate 60 and a second retaining plate 62 that each, independently, define a respective cable connector engaging portion 20. The first retaining plate 60 and the second retaining plate 62 each define a generally flat surface 64 for mounting against and creating an interface with a corresponding exterior surface defined by the electrical enclosure 120 that defines the cable connector receiving opening 122. In some embodiments, for example, one or both of the first retaining plate 60 and the second retaining plate 62 may include an outwardly extending edge portion 66 that extends outwardly away from the generally flat mounting surface 64 of the retaining plate 60, 62. The outwardly extending edge portion 66 may serve to facilitate mounting of the retaining plate 60, 62 to the enclosure 120 by providing an additional surface and/or edge for gripping the retaining plate 60, 62 and for positioning the retaining plate 60, 62 relative to the enclosure 120. The cable connector engaging portion 20 of each of the first retaining plate 60 and the second retaining plate 62, independently, is defined by an edge-defining portion 68 of the respective one of the first retaining plate 60 and the second retaining plate 62 wherein the edge-defining portion is shaped to correspond to the outer profile of the first housing portion 22 of the cable connector 12 and corresponding retainer receiving groove 16. In particular, in example embodiments wherein the first housing portion 22 of the cable connector 12 is a generally cylindrical shaped body, the edge-defining portion 68 of the first and second retaining plates 60, 62 that defines the corresponding cable-connector engaging portion 20 is an arcuate edge-defining portion. Accordingly, when the first and second retaining plates 60, 62 are positioned relative to the first housing portion 22 of the cable connector 12, the cable connector receiving portion 20 of the first retaining plate 60 is received within a portion of the retainer receiving groove 16 such that the edge-defining portion 68 of the first retaining plate 60 is follows the curvature of and is disposed in face-to-face arrangement with a portion of the base surface 25 of the retainer receiving groove 16. Similarly, the cable connector engaging portion 20 of the second retaining plate 62 is received within a portion of the retainer receiving groove 16 such that the edge-defining portion 68 of the second retaining plate 62 follows the curvature of and is disposed in face-to-face arrangement with a corresponding portion of the base surface of the retainer receiving groove 16. Accordingly, the first and second retaining plates 60, 62 and the retainer receiving groove 16 defined by the first housing portion 22 are cooperatively configured such that the groove 16 has a width, W1, that is sized to accommodate the cable connector engaging portion 20 defined by each of the first and second retaining plates 60, 62. In the subject example embodiment, the first retainer plate 60 is arranged as an upper retainer plate while the second retainer plate 62 is arranged as a lower retainer plate such that the edge defining portion 68 of the cable connector engaging portion 20 of the first retainer plate 60 follows the upper portion of the retainer receiving groove 16, while the edge defining portion 68 of the cable connector engaging portion 20 of the second retainer plate 60 follows the lower portion of the retainer receiving groove 16. However, it will be understood that the first and second retainer plates 60. 62 are not limited to being arranged as respective upper and lower plates as is illustrated in the exemplary embodiment of FIGS. 1, 5-6.

Each of the first retaining plate 60 and the second retaining plate 62, independently, include a respective mating edge portion 70, the mating edge portion 70 extending laterally away from opposite ends of the edge-defining portion 68 of the cable-connector engaging portion 20. Accordingly, when the first retaining plate 60 and the second retaining plate 62 are arranged relative to one another about the first housing portion 22 of the cable connector 12 such that the cable connector engaging portion 20 of each of the first retaining plate 60 and the second retaining plate 62 is disposed within the corresponding portion of the retainer-receiving groove 16 defined by the first housing portion 22, the mating edge portion 70 of the first retaining plate 60 and the mating edge 70 of the second retaining plate 62 are disposed in abutting contact or abutting engagement with one another. In some embodiments, for example, arrangement of the first retaining plate 60 and the second retaining plate 62 relative to the first housing 22 of the cable connector 12 such that the mating edge 70 of the first retaining plate 60 is disposed in abutting contact with the mating edge 70 of the second retaining plate 62 assists with locating the first retaining plate 60 relative to second retaining plate 62 in mounting arrangement with the first housing portion 22 of the cable connector 20.

In the subject example embodiment, the cable connector engaging portion 20 of the first retaining plate 60 defines a first retaining plate engageable surface 75 that is configured for engaging an opposing surface defined by the rotation impeder 18. In some embodiments, the first retaining plate engageable surface 75 is defined at least in part by the edge-defining portion 68 of the cable connector engaging portion 20 of the first retaining plate 60, such that when the first retaining plate 60 is positioned relative to the first housing portion 22 such that the cable connector engaging portion 20 is received within the corresponding portion of the retainer receiving groove 16, a portion of the first retaining plate engageable surface 75 is disposed in face-to-face relationship with and/or opposite to a corresponding opposing surface 78 defined by the first protrusion 72 and the at least one additional protrusion, or second protrusion 74, respectively. Similarly, in some embodiments, for example, the cable connector engaging portion 20 of the second retaining plate 62 defines a second retaining plate engageable surface 77 that is configured for engaging an opposing surface defined by the rotation impeder 18. In some embodiments, for example, the second retaining plate engageable surface 77 is defined at least in part by the edge-defining portion 68 of the cable connector engaging portion 20 of the second retaining plate 60, such that when the second retaining plate 60 is positioned relative to the first housing portion 22 such that the cable connector engaging portion 20 of the second retaining plate 62 is received within the corresponding portion of the retainer receiving groove 16, a portion of the second retaining plate engageable surface 77 is disposed in face-to-face relationship with and/or opposite to a corresponding opposing surface 79 defined by the first protrusion 72 and the at least one additional protrusion or second protrusion 74, respectively. In some embodiments, for example, the first retaining plate engageable surface 75 and the second retaining plate engageable surface 77 are defined by a notch that is defined within the corresponding edge-defining portion 68 of the respective plate 60, 62 that creates an area of increased width, or an increased diameter, within the edge-defining portion 68 to accommodate mating engaging with the first protrusion 72 and the at least one additional protrusion, or second protrusion, 74 of the rotation impeder 18 when the first retaining plate 60 and the second retaining plate 62 are positioned relative to the first housing portion 22 such that the cable connector engaging portions 20 are received within the retainer receiving groove 16. As a result of the mating profiles defined by the edge-defining portion 68 and the retainer receiving groove 16 with rotation impeder 18, while the first housing portion 22 of the cable connector 12 is inserted within the cable connector receiving opening 122 defined by the enclosure and secured in position by the first and second retaining plates 60, 62, rotation of the first housing 22 relative to the enclosure 120, about the central longitudinal axis 29 of the housing 22 is resisted due to abutting engagement between the at least one of the first retaining plate engageable surface 75 and the corresponding opposing surface 78 defined by one of the first protrusion 72 or second protrusion 74, and the second retaining plate engageable surface 77 and the corresponding opposing surface 79 defined by one of the first protrusion 72 or second protrusion 74. Accordingly, it will be understood that the mating profiles defined by the edge-defining portion 68 and first retaining plate engageable surface 75 of the first retaining plate and the edge-defining portion 68 and second retaining plate engageable surface 77 of the second retaining plate with the stepped profile defined by the retainer receiving groove 16 of the first housing portion 22 create a locking profile between the cable connector 12 and retaining configuration 14 for preventing rotation of the cable connector 12 relative to the enclosure 120. In example embodiments wherein the at least one additional protrusion includes two or more protrusions 74, it will be understood that the edge defining portion 68 of the first and second retaining plates 60, 62 will be modified to provide corresponding engageable surfaces 75, 77 for each of the protrusions formed within the groove 16. Additionally, the mating engagement between the mating profiles defined by the edge-defining portion 68 and first retaining plate engageable surface 75 of the first retaining plate and the edge-defining portion 68 and second retaining plate engageable surface 77 of the second retaining plate, with the stepped profile defined by the retainer receiving groove 16 of the first housing portion 22 when the first housing portion 22 and the first and second retaining plates 60, 62 are co-operatively configured for securing the cable connector 12 to the enclosure 120, defines a more complex interface between the cable connector retaining assembly 10 and the enclosure 120 to ensure a robust sealing arrangement between the components. A robust sealing arrangement between the cable connector retaining assembly 10 and the enclosure 120 helps to ensure that, in use, the enclosure meets industry safety standards relating to explosion proof characteristics of the overall enclosure 120.

Referring again to FIGS. 5 and 6, in some embodiments, for example, the first retaining plate 60 and the second retaining plate 62 each, independently, include a first fastener-receiving opening 84 and a second-fastener-receiving opening 86 wherein the first fastener-receiving opening 84 and the second-fastener-receiving opening 86 are disposed at opposite sides of the corresponding retaining plate 60, 62. The first fastener-receiving opening 84 and the second-fastener-receiving opening 86 of each of the first and second retaining plates 60, 62 are configured for co-operating with a corresponding fastener 85 for securing the retaining plates 60, 62 to the enclosure 120. Specifically, the first fastener-receiving opening 84 and the second-fastener-receiving opening 86 of the first retaining plate 60 are specifically sized and arranged at respective sides of the retaining plate 60, for aligning with a corresponding fastener-receiving opening 124 located on the enclosure 120. Similarly, the first fastener-receiving opening 84 and the second-fastener-receiving opening 86 of the second retaining plate 62 are specifically sized and arranged at respective sides of the retaining plate 62, for aligning with a corresponding fastener-receiving opening 124 located on the enclosure 120. In preferred embodiments, for example, the positioning of the fastener-receiving openings 124 on the enclosure 120 relative to the position of the cable connector-receiving opening 122 is such that when the cable connector 12 is inserted into the cable connector-receiving opening 122 and secured in position by the first and second retaining plates 60, 62, by the fastening of the first and second retaining plates 60, 62 to the enclosure 120 by respective fasteners 85 that are inserted through the respective ones of the aligned first and second fastener-receiving openings 84, 86 of the first and second retaining plates 60, 62, and connected to the enclosure 120, for example, via a threaded connection with the fastener receiving openings 124 defined by the enclosure 124, the central longitudinal axis 29 of the cable connector 12, which extends through the internal passage 26 defined by the cable connector 12, is axially aligned with the central longitudinal axis of the cable connector-receiving opening 122. This is so that any remaining gap between the outer surface 23 of the first housing portion 22 of the cable connector 12 and the inner surface of the cable connector-receiving opening 122 between the sealing member 80 and the second end 30 of the first housing portion is maintained at a minimum and is uniform about the perimeter of the first housing portion 22 of the cable connector 12. By ensuring that any gap that remains between the outer surface 23 of the first housing portion 22 and the inner surface of the cable connector-receiving opening 122 is kept to minimum and is uniform about the perimeter of the cable connector 12 helps to ensure a robust sealing arrangement between the cable connector 12 and the enclosure 120 given that the size of the overall gap is controlled with manufacturing tolerances that are achievable to mitigate the risk of a spark transversing the gap between the connector receiver opening 122, and the outer surface 23 of the corresponding cable connector retaining assembly 10.

The use and assembly of the cable connector retaining assembly 10 will now be described in further detail, with particular reference to the example embodiment of FIG. 1. As described above, the cable connector 12 is configured for securing an electrical cable to an electrical enclosure 120. In some embodiments, for example, the first housing portion 22 is slidably inserted into the cable connector receiving opening 122 and is secured in position within the connector receiving opening 122 by the engagement between the cable connector engaging portions 20 of the first and second retaining plates 60, 62 within the retainer receiving groove 16 defined by the first housing portion 12 such that the cable connector engaging portions 20 of the first and second retaining plates 60, 62 are recessed within the retainer receiving groove 16, the first and second retaining plates 60, 62 being secured to the enclosure via fasteners 85. Once the first housing portion 22 is secured to the enclosure 120, the first housing 22 is configured for coupling with the second housing portion 24 to effect connection of an electrical cable 110 to the enclosure.

The cable 110 is configured for insertion through the internal passage 40 defined by the second housing portion 24 of the cable connector 12. Once the cable 110 is inserted through the second housing portion 24 and extends outwardly from the coupling end 44 of the second housing portion 24, the free end of the cable 110 is disposed for insertion through the first housing portion 22. In order to ensure a sealed arrangement between the cable 110 and the first housing portion 22 when the first housing portion 22 and the second housing portion 24 are releasably coupled together, the internal passage 26 defined by the first housing portion 22 is configured to accommodate a plurality of sealing members 90 that are disposed on the free end of the cable 110. In some embodiments, for example, the plurality of sealing members 90 are elastomeric annular members that are arranged in series on the free end of the cable 110. To prevent the plurality of sealing members 90 from passing through or extruding through the second end opening 34 defined by the second end 30 of the first housing portion 22 when the first and second housing portions 22, 24 are releasable coupled together, the plurality of sealing members 90 are arranged between first and second compression plates 92 that are also arranged on the free end of the cable 110. When the free end of the cable 110 is inserted within the internal passage 26 of the first housing portion 22, the first compression plate 92 will engage the end surface 36, or stop, defined at the second end 30 of the first housing portion 22, thereby preventing the series of sealing members from passing through the second end opening 34 of the housing 22. As the second housing portion 24 is secured to the first housing portion 22 via the releasable coupling between the first end 28 of the first housing portion 22 and the coupling end 52 of the second housing portion 24, the coupling end 52 is drawn into the internal passage 26 of the first housing portion 22 and acts against the second compression plate 92 (or bushing) such that the plurality of sealing members 90 are compressed between first and second compression plates 92 which compression causes radial expansion of the annular bodies defined by the sealing members 90 which expansion creates a sealed interface between an external surface of the cable 110 and the inner surface of the annular shaped sealing members 90 as well as a sealed interface between the outer surface of the annular shaped sealing members 90 and the inner surface that defines the internal passage 26 of the first housing. Due to the anti-rotation effect of the mating profiles defined by the respective edge-defining portions 68 of the first and second retaining plates 60, 62 and the stepped profile defined by the retainer receiving groove 16, the releasable coupling of second housing portion 24 to the first housing portion 22 is also facilitated given that the rotation of the first housing portion 22 relative to the enclosure is prevented. As well, given that the first housing portion 22 is slidably inserted into the corresponding cable connector receiving opening 122 and secured in position by the first and second retaining plates 60, 62, as opposed to via a threaded connection, the desired torque defined by the releasable coupling between the first housing portion 22 and the second housing portion 24 can be more easily maintained at tolerance. As described above, in conventional cable connectors for explosion proof electrical enclosures, the flame path is defined as the path that a flame that developed within the enclosure would have to take in order to exit the enclosure and is defined by the interface that is defined between the cable connector and the enclosure. In the example embodiment of the present disclosure, the cable connector retaining assembly 10 provides for a complex flame path with various sealed interfaces in order to achieve a more robust overall arrangement between the cable connector retaining assembly 10 and the enclosure 120 which is effective for allowing the energy associated with a possible internal explosion within the enclosure to dissipate to a safe level prior to exiting the enclosure. The more complex flame path is due, in part to the mating engagement between the first and second retaining plates 60, 62 and the retainer receiving groove 16 defined by the first housing portion 22. The sealed interfaces created by the external sealing member 80 disposed on the outer surface of the first housing portion 22 and the sealed interfaces formed within the cable connector 12 by the arrangement of the plurality of sealing members within the first and second housing portions 22, 24 also contribute to a complex flame path that is effective for mitigating against the potential dangers associated with an explosive event within the enclosure.

While various embodiments of the cable connector retaining assembly have been described, it will be understood that certain adaptations and modifications of the described embodiments can be made. Therefore, the above discussed embodiments are considered to be illustrative and not restrictive.

What is claimed is:

1. A cable connector retaining assembly, comprising:

a cable connector configured for slidable insertion into a cable connector receiving opening defined by an electrical enclosure;

a retaining configuration configured for coupling with the cable connector and for securing the cable connector to the electrical enclosure;

wherein:

the cable connector includes:

a retainer receiving groove; and a rotation impeder;

the cable connector and the retaining configuration are co-operatively configured for connection to the electrical enclosure such that, while the cable connector is disposed within the cable connector receiving opening and the retaining configuration is connected to the enclosure:

the cable connector is supported within the cable connector receiving opening by the retaining configuration;

a cable connector engaging portion of the retaining configuration is disposed within the retainer receiving groove such that longitudinal displacement of the cable connector within the cable connector receiving opening, relative to the enclosure, is resisted;

and rotation of the cable connector within the cable connector receiving opening relative to the retaining configuration is impeded due to interference to movement between the rotation impeder and an opposing surface defined by the cable connector engaging portion.

2. The cable connector retaining assembly as claimed in claim 1;

wherein:

the cable connector includes:

a first housing portion; and a second housing portion configured for releasable connection to the first housing portion for securing a cable within the first housing portion.

3. The cable connector retaining assembly as claimed in claim 2;

wherein:

the retainer receiving groove is recessed into an outer surface of the housing and extends about 360 degrees about the housing.

4. The cable connector retaining assembly as claimed in claim 2;

wherein:

the first housing portion includes an internal passage for receiving an end portion of a cable, the internal passage extending longitudinally through the first housing portion from a first end to a second end, the first end defining a first end opening having a first diameter and the second end defining a second opening having a second diameter that is less than the first diameter.

5. The cable connector retaining assembly as claimed in claim 4;

further comprising:

a sealing member disposed on an outer surface of the first housing such that while the cable connector is disposed within the cable connector receiving opening and is secured to the enclosure via the retaining configuration, a sealed interface is established between the cable connector and the cable connector receiving opening via the sealing member.

6. The cable connector retaining assembly as claimed in claim 3;

wherein:

the housing includes a sealing member receiving groove disposed on the outer surface of the housing for receiving the sealing member; and the sealing member receiving groove is longitudinally spaced apart from the retainer receiving groove such that the sealing member receiving groove is more inwardly disposed relative to the first end of the first housing portion than the retainer receiving groove.

7. The cable connector retaining assembly as claimed in claim 4;

wherein:

the second housing portion includes an internal passage extending longitudinally through the second housing portion from a cable-receiving end to a coupling end configured for coupling with the first housing portion such that the releasable connection is established.

8. The cable connector retaining assembly as claimed in claim 7;

wherein:

the releasable connection is a threaded connection, the threaded connection defined by engagement between an internal thread defined by the internal passage of the first housing portion and an external thread defined by the coupling end of the second housing portion.

9. The cable connector retaining assembly as claimed in claim 7;

further comprising:

a first compression surface disposed within the internal passage of the housing;

a second compression surface disposed within the internal passage of the housing; and one or more sealing members disposed intermediate the first and second compression surfaces;

wherein:

the first compression surface, the second compression surface and the one or more sealing members are configured for cooperating with the cable such that:

while the cable extends through the internal passage of the second housing portion and is received within the first housing portion, the cable extends through the second compression surface, the one or more sealing members and the first compression surface and into the enclosure; and while the second housing portion is releasably connected to the first housing portion, a first sealed interface is established between the one or more sealing members and an outer surface of the cable, and a second sealed interface is established between the one or more sealing members and the internal passage of the housing in response to displacement of the second compression surface towards the first compression surface in response to the releasable connection of the second housing portion to the first housing portion.

10. The cable connector retaining assembly as claimed in claim 1;

wherein:

the retaining configuration includes a first retaining plate and a second retaining plate, each one of the first retaining plate and the second retaining plate, independently, including a cable connector engaging portion;

the first retaining plate, the second retaining plate and the cable connector being co-operatively configured such that, while the cable connector is disposed within the cable connector receiving opening and the retaining configuration is connected to the enclosure:

the first retaining plate cable connector engaging portion is disposed within a first portion of the retainer receiving groove;

the second retaining plate cable connector engaging portion is disposed within a second portion of the retainer receiving groove; and the first retaining plate and the second retaining plate are disposed relative to one another such that a mating edge of the first retaining plate is disposed in abutting engagement with a mating edge of the second retaining plate.

11. The cable connector retaining assembly as claimed in claim 10;

wherein:

the first retaining plate cable connector engaging portion includes a first retaining plate engageable surface;

the second retaining plate cable connector engaging portion includes a second retaining plate engageable surface; and while the cable connector is disposed within the cable connector receiving opening and the retaining configuration is connected to the enclosure such that the first retaining plate cable connector engaging portion is disposed within the first portion of the receiving groove and the second retaining plate cable connector engaging portion is disposed within the second portion of the retainer receiving groove:

the first retaining plate engageable surface is disposed in abutting engagement with a first opposing surface of the rotation impeder, and the second retaining plate engageable surface is disposed in abutting engagement with a second opposing surface of the rotation impeder with effect that rotation of the cable connector within the cable connector receiving opening, relative to the retainer configuration, is prevented.

12. The cable connector retaining assembly as claimed in claim 11;

wherein:

the rotation impeder includes:

at least a first protrusion disposed within the retainer receiving groove, the first protrusion extending radially outwardly from a base surface defined by the retainer receiving groove, the first protrusion having a height as measured along an axis that extends normal to the base surface that is less than a depth of the retainer receiving groove.

13. The cable connector retaining assembly as claimed in claim 12;

wherein:

the first retaining plate includes a first fastener-receiving opening and a second fastener-receiving opening, each opening, independently, configured for alignment with a corresponding opening located on the enclosure for locating the first retainer plate relative to the enclosure; and the second retaining plate includes a first fastener-receiving opening and a second fastener-receiving opening, each opening, independently, configured for alignment with a corresponding opening located on the enclosure for locating the second retainer plate relative to the enclosure.

14. The cable connector retaining assembly as claimed in claim 12;

wherein:

the rotation impeder includes at least one additional protrusion disposed within the retainer receiving groove such that the first protrusion and each one of the at least one additional protrusion, independently, are spaced apart from each other within the retainer receiving groove;

each one of the at least one additional protrusion extending radially outwardly from the base surface such that each one of the at least one additional protrusion, independently, has a height as measured along an axis that extends normal to the base surface that is less than a depth of the retainer receiving groove.

15. The cable connector retaining assembly as claimed in claim 14;

wherein:

the locating of the first retaining plate and the second retaining plate relative to the enclosure is such that, while the cable connector is disposed within the cable connector receiving opening and is coupled to the enclosure via the retaining configuration, a central longitudinal axis extending through the cable connector is disposed in axial alignment with a central longitudinal axis of the cable connector receiving opening.

16. The cable connector retaining assembly as claimed in claim 14;

wherein:

the first protrusion and each one of the at least one additional protrusion are spaced apart from each other within the retainer receiving groove such that the distance between each adjacent pair of protrusions is the same.

* * * * *